United States Patent
Pate

(10) Patent No.: US 7,478,758 B2
(45) Date of Patent: Jan. 20, 2009

(54) METHOD AND APPARATUS FOR AUTOMATICALLY TRACKING AND COMMUNICATING DATA STORAGE DEVICE INFORMATION USING RF TAGS: OPERATING CONDITION, CONFIGURATION AND LOCATION

(75) Inventor: James Pate, Derby, KS (US)

(73) Assignee: LSI Corporation, Milpitas, CA (US)

( * ) Notice: Subject to any disclaimer, the term of this patent is extended or adjusted under 35 U.S.C. 154(b) by 248 days.

(21) Appl. No.: 10/620,778

(22) Filed: Jul. 15, 2003

(65) Prior Publication Data

US 2005/0011948 A1  Jan. 20, 2005

(51) Int. Cl.
G06K 19/05 (2006.01)

(52) U.S. Cl. ...................... 235/492; 235/385

(58) Field of Classification Search ................ 235/492, 235/376, 383–385; 340/572.4, 825.36, 825.49, 340/5.92
See application file for complete search history.

(56) References Cited

U.S. PATENT DOCUMENTS

| 5,559,982 | A | * | 9/1996 | Wideman | 711/111 |
| 5,598,528 | A | * | 1/1997 | Larson et al. | 714/7 |
| 5,886,634 | A | * | 3/1999 | Muhme | 340/572.1 |
| 5,966,300 | A | * | 10/1999 | Flood et al. | 700/2 |
| 6,177,871 | B1 | * | 1/2001 | Rasband | 340/572.5 |
| 6,335,685 | B1 | * | 1/2002 | Schrott et al. | 340/572.1 |
| 6,427,913 | B1 | * | 8/2002 | Maloney | 235/383 |
| 6,505,780 | B1 | | 1/2003 | Yassin et al. | 235/492 |
| 6,545,604 | B1 | | 4/2003 | Dando et al. | 340/572.1 |
| 6,621,410 | B1 | * | 9/2003 | Lastinger et al. | 340/10.42 |
| 6,659,344 | B2 | * | 12/2003 | Otto et al. | 235/381 |
| 6,669,089 | B2 | * | 12/2003 | Cybulski et al. | 235/385 |
| 6,724,308 | B2 | * | 4/2004 | Nicholson | 340/572.1 |
| 6,747,560 | B2 | * | 6/2004 | Stevens, III | 340/572.4 |
| 6,754,605 | B1 | * | 6/2004 | Pate et al. | 702/115 |
| 6,829,520 | B1 | * | 12/2004 | Green | 700/225 |
| 6,830,181 | B1 | * | 12/2004 | Bennett | 235/440 |
| 6,845,909 | B2 | * | 1/2005 | Bong et al. | 235/385 |
| 6,866,195 | B2 | * | 3/2005 | Knowles et al. | 235/385 |
| 6,908,034 | B2 | * | 6/2005 | Alleshouse | 235/432 |
| 6,929,181 | B1 | * | 8/2005 | Oswalt | 235/385 |
| 6,935,560 | B2 | * | 8/2005 | Andreasson et al. | 235/385 |
| 7,002,451 | B2 | * | 2/2006 | Freeman | 340/10.51 |
| 7,014,112 | B2 | * | 3/2006 | deVos et al. | 235/451 |

* cited by examiner

Primary Examiner—Daniel St.Cyr
(74) Attorney, Agent, or Firm—Suiter Swantz PC LLO

(57) ABSTRACT

The present invention is directed to a method and apparatus for automatically tracking and communicating data storage device information using RF (radio frequency) tags. An apparatus includes a data storage device and a RF tag attached to the data storage device, wherein the RF tag contains information about the data storage device. Using such an apparatus, assembling, selecting, logging and maintaining a data storage device may be done automatically.

1 Claim, 4 Drawing Sheets

METHOD AND APPARATUS FOR AUTOMATICALLY TRACKING AND COMMUNICATING DATA STORAGE DEVICE INFORMATION USING RF TAGS: OPERATING CONDITION, CONFIGURATION AND LOCATION

FIELD OF THE INVENTION

This invention relates generally to electronic tracking of data storage devices, and particularly to a method and apparatus for automatically tracking and communicating data storage device information using RF (radio frequency) tags, wherein the RF tags may use EEPROM or flash memory to store relevant data.

BACKGROUND OF THE INVENTION

Radio frequency identification (RFID) is a system that reads data from a RF tag (or tag) and/or writes data to a tag that is present in a radio frequency field projected from a RF reader. A RF reader may read data from a tag and/or write data to a tag. Data on a tag may be contained in one (1) or more bits for the purpose of providing identification and other information relevant to the object to which the tag is attached. RFID incorporates the use of electromagnetic or electrostatic coupling in the radio frequency portion of the spectrum to communicate to or from a tag through a variety of modulation and encoding schemes.

A RF tag works conventionally by first recording or "burning in" identification or other data on the tag. Thereafter, the tag sends the recorded identification or other information to a RF reader. A particular advantage of RF tags over bar code, optical characters and magnetic storage (such as the magnetic strip on many credit cards) is that the RF tag does not require physical contact, or as is the case with optical character and bar code readers, line of sight, between the tag and the reading device to be read.

The RF tag memory may comprise read-only (ROM), random access (RAM) and non-volatile programmable memory for data storage depending upon the type and sophistication of the tag. The ROM-based memory is used to accommodate security data and the tag operating system instructions which, in conjunction with the processor or processing logic, deals with the internal "house-keeping" functions such as response delay timing, data flow control and power supply switching. The RAM-based memory is used to facilitate temporary data storage during tag interrogation and response. The non-volatile programmable memory is used to store the tag data and needs to be non-volatile to ensure that the data is retained when the tag is in its quiescent or power-saving "sleep" state. The non-volatile programmable memory may take various forms, electrically erasable programmable read only memory (EEPROM) being typical. Those of ordinary skill in the art will understand that the non-volatile programmable memory may also be flash memory (sometimes called "flash RAM"), which is a type of constantly-powered nonvolatile memory that can be erased and reprogrammed in units of memory called blocks. Flash memory is a variation of EEPROM which, unlike flash memory, is erased and rewritten at the byte level, which is slower than flash memory updating.

Depending upon the type of memory a RF tag contains, the data carried by the tag may be read-only, write once read many (WORM), or read/write. Read-only tags are typically low capacity devices programmed at source (factory programmed), usually with an identification number. WORM tags are user programmable (field programmable) devices. Read/write tags are also user-programmable but allow the user to change data stored in a tag.

Data storage devices such as controllers, drive trays, and the like, are conventionally manufactured by a company for an OEM (original equipment manufacturer) customer. It is often a labor intensive and time consuming process for the manufacturer to assemble, select, track, log, and maintain data storage devices. Thus, it would be desirable to provide a method and apparatus for automatically tracking and communicating data storage device information using RF tags.

SUMMARY OF THE INVENTION

Accordingly, the present invention is directed to a method and apparatus for automatically tracking and communicating data storage device information using RF tags.

In a first aspect of the present invention, a method for manufacturing a data storage device includes: placing a RF tag on a data storage device; and assembling the data storage device based on the RF tag, wherein the RF tag provides information on an assembly method.

In an additional aspect of the present invention, a method for shipping a data storage device includes: reading a RF tag attached on a data storage device to select the data storage device; and shipping the data storage device to a customer.

In an another aspect of the present invention, a method for tracking and utilizing a data storage device includes: entering information about a data storage device into a database through reading a RF tag placed on the data storage device when a customer receives the data storage device from a manufacturer; and storing the data storage device in an inventory based on the RF tag, wherein the RF tag contains hardware and software configuration information about the data storage device.

In a further aspect of the present invention, a method for a manufacturer to maintain a data storage device includes: notifying a manufacturer of a failure or potential failure of a data storage device; and locating the data storage device via a RF tag placed on the data storage device and via global positioning system by the manufacturer, wherein the RF tag contains hardware and software configuration information about the data storage device. A field engineer may record changes made to the hardware and software configuration information about the data storage device by programmatically writing to the RF tag.

In a still further aspect of the present invention, a method for a manufacturer to repair a returned data storage device includes: reading a RF tag attached on a returned data storage device, the RF tag containing hardware and software configuration information about the returned data storage device; and inquiring whether a warranty period for the returned data storage device has expired or whether the hardware and software configuration information is different from original configuration information.

In an additional aspect of the present invention, an apparatus includes a data storage device and a RF tag attached to the data storage device, wherein the RF tag contains information about the data storage device.

It is to be understood that both the foregoing general description and the following detailed description are exemplary and explanatory only and are not restrictive of the invention as claimed. The accompanying drawings, which are incorporated in and constitute a part of the specification, illustrate an embodiment of the invention and together with the general description, serve to explain the principles of the invention.

BRIEF DESCRIPTION OF THE DRAWINGS

The numerous advantages of the present invention may be better understood by those skilled in the art by reference to the accompanying figures in which.

DETAILED DESCRIPTION OF THE INVENTION

Reference will now be made in detail to the presently preferred embodiments of the invention, examples of which are illustrated in the accompanying drawings.

In a preferred embodiment, a RF tag attached to a data storage device may be used to contain information such as hardware and software configurations, operating conditions, and the like about the data storage device. Hardware configuration may include the number of drive trays, controllers, HBAs (host bus adapters), types, models, and the like. Software configuration may include LUN (logic unit number) configuration, software release and premium features, and the like. Such a tag may use EEPROM, flash memory, or the like to store hardware and software configurations and may be used in the processes shown in FIGS. 1-5 below.

In a preferred embodiment, every operation involving a configuration change and/or a geographic location change to a data storage device may be recorded and tracked using a RF tag attached to the data storage device, RF reader, database engines (i.e., SQL or Structured Query Language), and a database. This may remove the cost and inherent errors associated with manually performing these activities.

Figure 1:
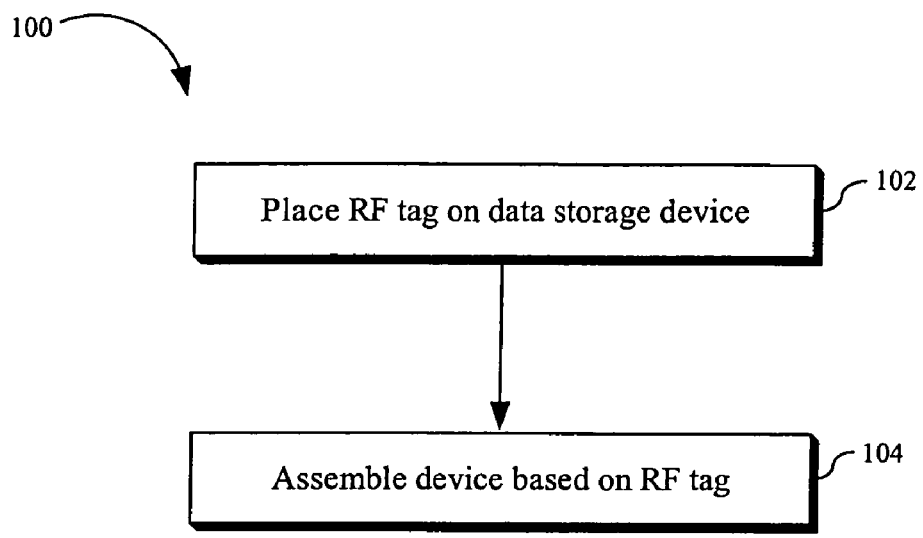
FIG. 1 is a flow chart of an exemplary process used for manufacturing a data storage device in accordance with an exemplary embodiment of the present invention.

Referring now to FIG. 1, a flow chart of an exemplary process 100 used for manufacturing a data storage device in accordance with an exemplary embodiment of the present invention is shown. The process 100 may start with step 102 in which a RF tag is placed on a data storage device. The RF tag may be a read-only, WORM, or read/write tag. The RF tag may store the job number for each unit and customer unique configurations. Next, in step 104 the data storage device may be assembled based on the RF tag. The job number stored on the RF tag may be correlated to a work station ID, which may automatically display the correct assembly method. After the assembling is finished, the data storage device may be tested based on the RF tag, wherein the RF tag may automatically display the correct test method. This may result in reduced time to build the product and fewer assembly errors because there may be no opportunity to select the wrong assembly or test method.

Figure 2:
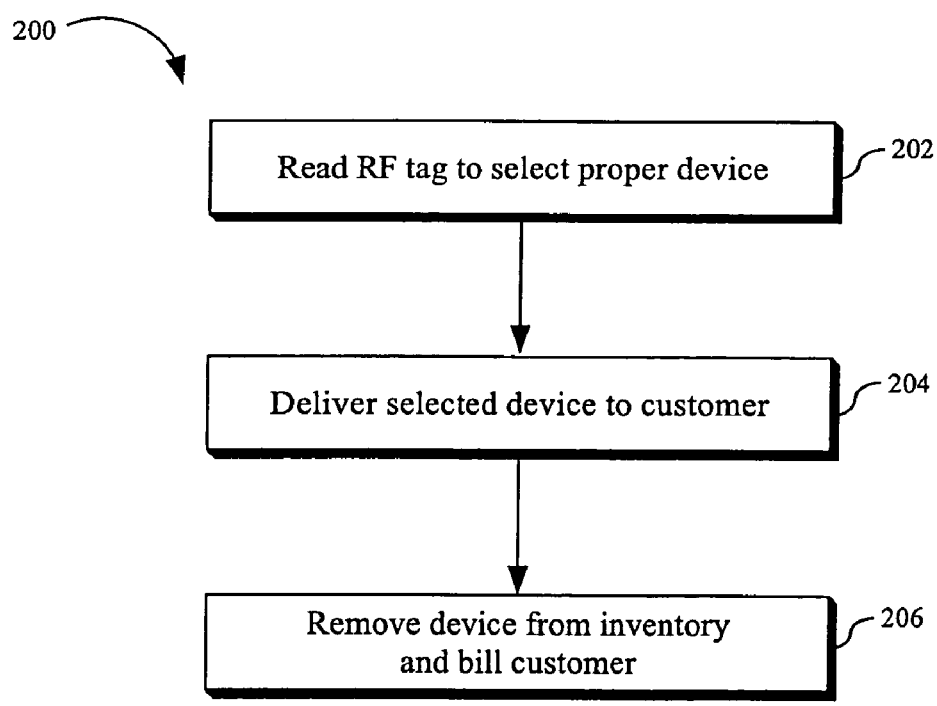
FIG. 2 is a flow chart of an exemplary process for shipping a data storage device in accordance with an exemplary embodiment of the present invention.

FIG. 2 is a flow chart of an exemplary process 200 for shipping a data storage device in accordance with an exemplary embodiment of the present invention. The process 200 starts with step 202, in which RF tags of various data storage devices are read by a RF reader to select the desired data storage device. Then the selected data storage device is shipped to the customer 204. Next the selected data storage device is automatically removed from the manufacturer's inventory based on the RF tag and the customer is automatically billed based on the RF tag 206.

Figure 3:
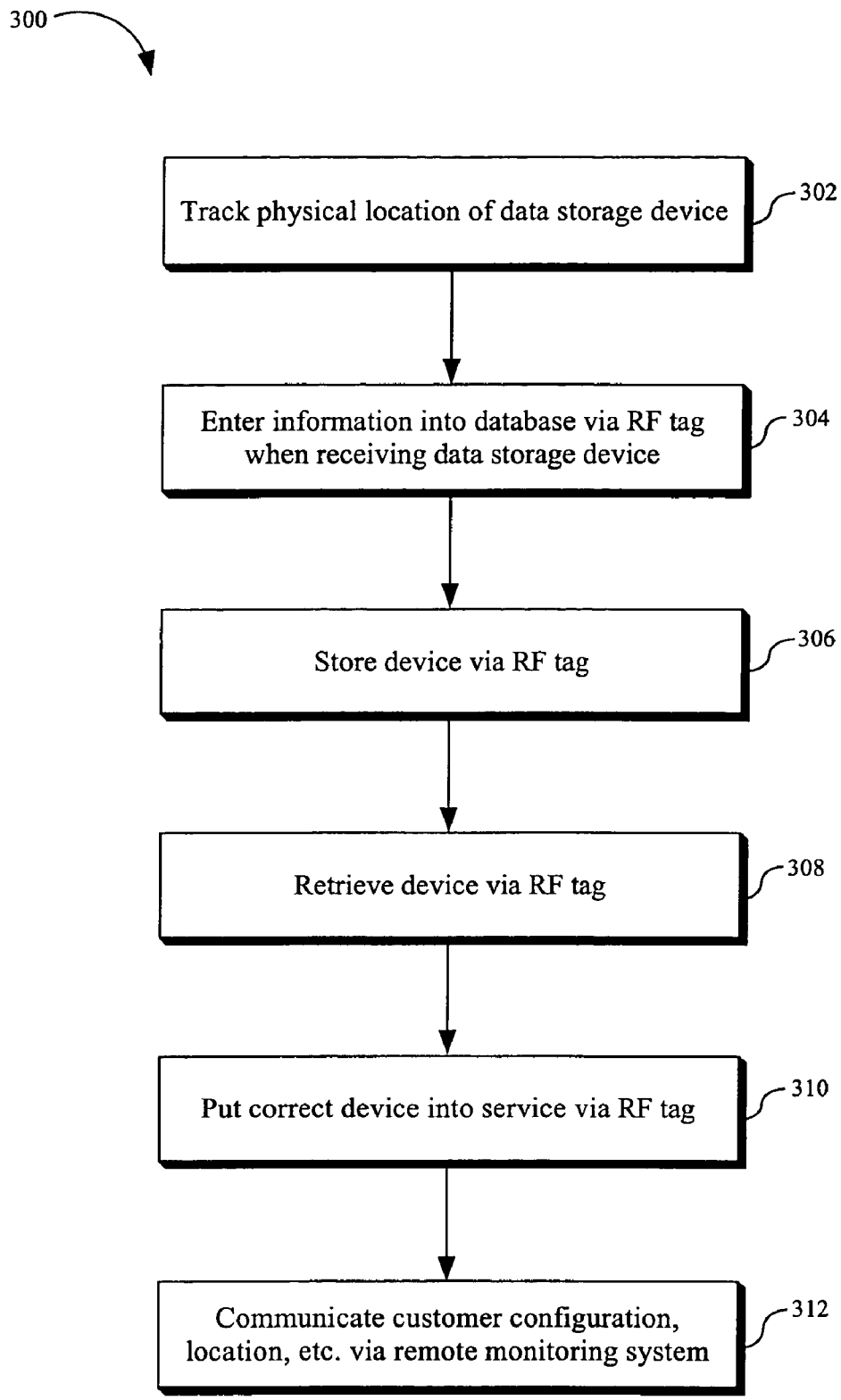
FIG. 3 is a flow chart of an exemplary process for tracking and utilizing a data storage device in accordance with an exemplary embodiment of the present invention.

FIG. 3 is a flow chart of an exemplary process 300 for tracking and utilizing a data storage device in accordance with an exemplary embodiment of the present invention. After a data storage device leaves a manufacturer's site, the customer may track the data storage device during transportation via the RF tag attached to the data storage device 302. For example, the RF tag may provide the customer with a unique number or symbol so the customer may check with a database to see the movement of the data storage device. Alternatively, the customer may track the data storage device via the RF tag and the GPS (global positioning system). Next, in step 304, when the data storage device is received by the customer, the data storage device information that contained on the RF tag may be automatically loaded into the customer's database through reading the RF tag by a RF reader. Thus, manual entry is not needed. Moreover, the customer may ensure the correct data storage device is received via the RF tag. Optionally, the customer may be billed upon entry of the data storage device in its database. Then, the data storage device may be stored in an inventory via the RF tag by the customer 306. When the data storage device needs to be used, the data storage device is retrieved from the inventory via the RF tag 308. Next the data storage device is put into use via the RF tag 310. Through use of the RF tag, correct installation of the data storage device may be verified and recorded on the RF tag. If installation is successful, information about the data storage device such as hardware and software configurations, location, and the like may be communicated to the manufacturer via the RF tag and a remote monitoring system utilizing an EDI (electronic data interchange), the Internet, extranet, intranet, and the like 312. In one embodiment, the remote monitoring system may be outfitted with a RF reader.

Figure 4:
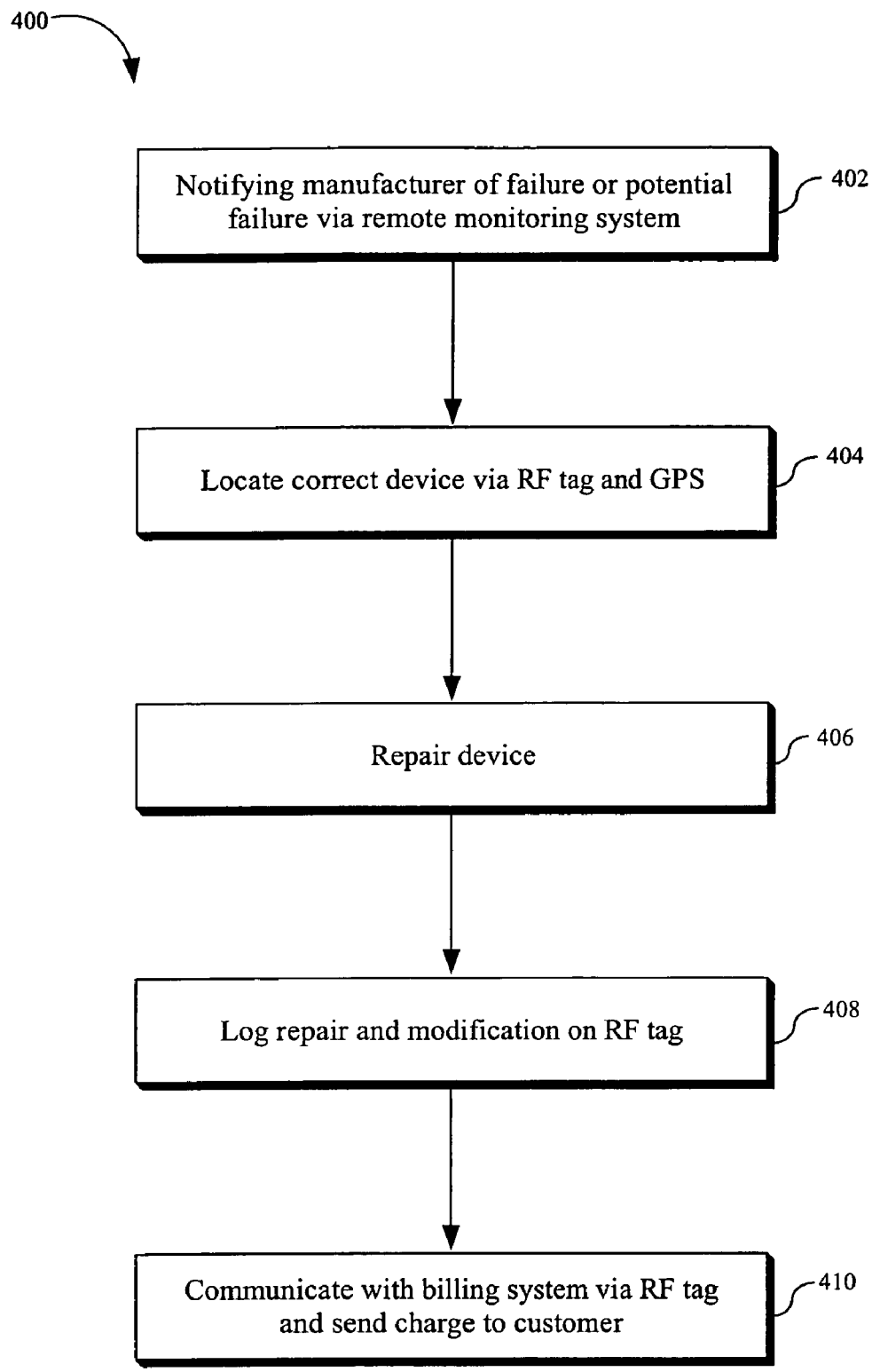
FIG. 4 is a flow chart of an exemplary process for maintaining a data storage device in accordance with an exemplary embodiment of the present invention.

FIG. 4 is a flow chart of an exemplary process 400 by a manufacturer to maintain a data storage device in accordance with an exemplary embodiment of the present invention. The process 400 starts with step 402 in which a manufacturer is notified of a failure or potential failure of a data storage device at a customer's site via a remote monitoring system. Hardware and software configurations of the date storage device may be transferred programmatically to a RF tag attached to the data storage device. The manufacturer (or its technician) may be notified via SCADA (supervisory control and data acquisition) technology to a pager, email, cell phone, and the like. Next, the data storage device may be located via the RF tag and the GPS 404. This may ensure that the correct data storage device will be repaired and may speed time to physically locate the data storage device. Then the data storage device is repaired by a technician at the customer's site 406. The technician may locate the correct data storage device via the RF tag and/or a GPS. Additionally, repair job may be scheduled and preparation may be performed prior to the technician's arrival. After repair is done, repair and modification information may be logged (written) on the RF tag 488. Then the manufacturer's billing system may be communicated via the RF tag and charge may be automatically sent to the customer 410.

Figure 5:
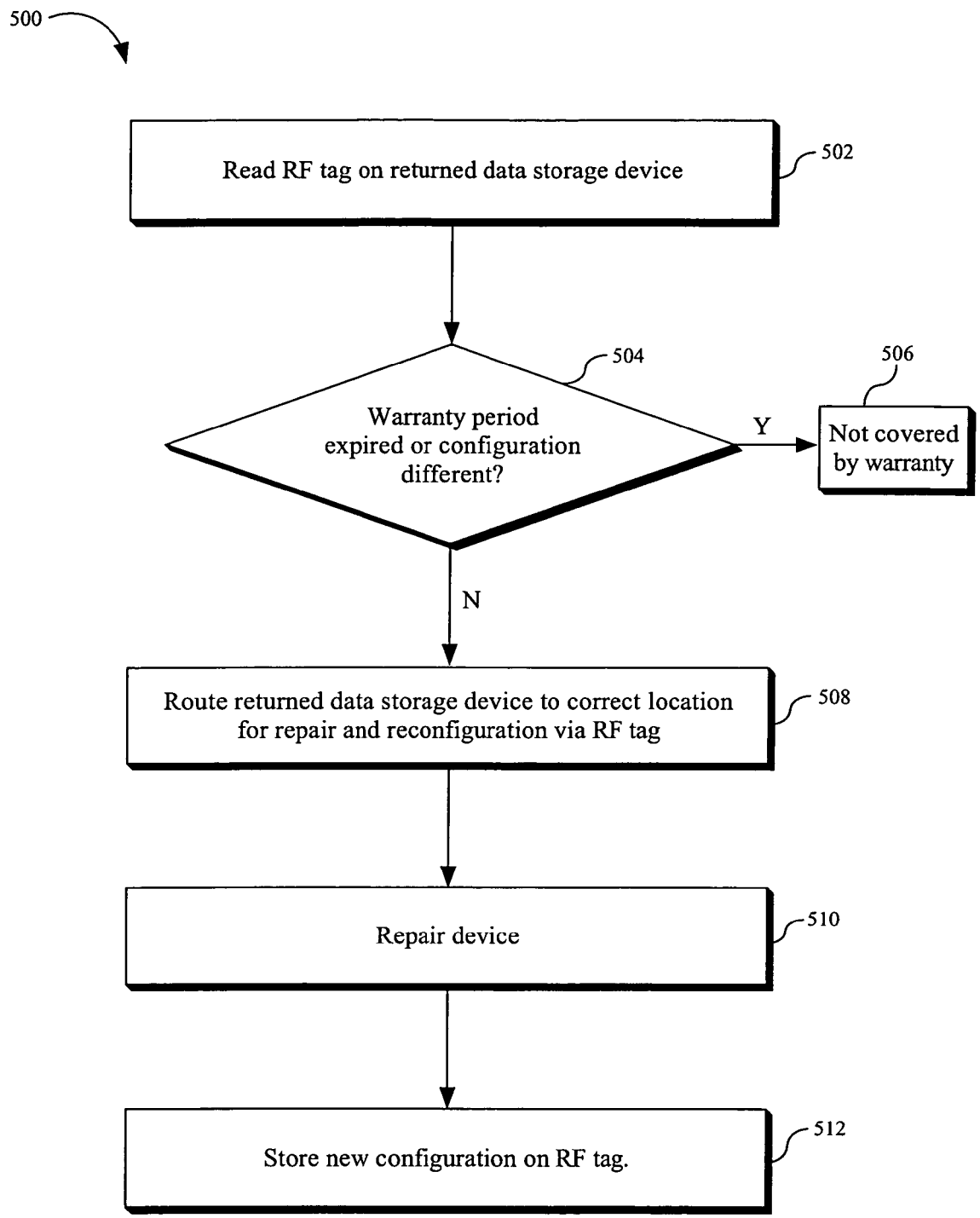
FIG. 5 is a flow chart of an exemplary process used for repairing a returned data storage device in accordance with an exemplary embodiment of the present invention.

FIG. 5 is a flow chart of an exemplary process 500 used by a manufacturer to repair a returned data storage device in accordance with an exemplary embodiment of the present invention. The process 500 starts with step 502 in which the RF tag attached to a returned data storage device (by a customer) is read by a RF reader (at the manufacturer's site). The RF tag may contain the current information about the data storage device such as the current hardware and software configuration, and the like. Next in step 504 an inquiry of whether the warranty period has expired or whether the current configuration is different from the original (thus voiding the manufacturer's warranty) may be held by reading the RF tag. If the answer is yes, the data storage device is not covered by the warranty 506. If the answer is no, then the returned data storage device is routed to the correct location for repair and reconfiguration via the RF tag 508. Without using the RF tag, it is often difficult to decide whether a returned data storage device is covered by the warranty, and as a result the returned data storage device is routinely repaired. However, using the RF tag, the cost associated with repairing returned data storage devices that are not covered by the warranty may be minimized.

Next, the data storage device is repaired 510. This may be performed according to the instructions stored on the RF tag. Then new configuration information is stored (written) on the RF tag 512. After this, the data storage device may be delivered to the customer.

The present invention is advantageous because it may reduce or even eliminate manual labor and associated variability, inherent to the operator manually selecting, tracking, logging and maintaining data storage devices.

It is understood that the specific order or hierarchy of steps in the processes disclosed is an example of exemplary approaches. Based upon design preferences, it is understood that the specific order or hierarchy of steps in the processes may be rearranged while remaining within the scope of the present invention. The accompanying method claims present elements of the various steps in a sample order, and are not meant to be limited to the specific order or hierarchy presented.

It is believed that the present invention and many of its attendant advantages will be understood by the foregoing description. It is also believed that it will be apparent that various changes may be made in the form, construction and arrangement of the components thereof without departing from the scope and spirit of the invention or without sacrificing all of its material advantages. The form herein before described being merely an explanatory embodiment thereof, it is the intention of the following claims to encompass and include such changes.

What is claimed is:

1. A method for tracking and utilizing a data storage device, comprising:
    tracking a physical location of said data storage device based on a RF tag placed on said data storage device before said data storage device reaches a customer;
    entering information about said data storage device into a database through reading said RF tag when the customer receives said data storage device from a manufacturer;
    storing said data storage device in an inventory based on said RF tag;
    retrieving said data storage device from said inventory based on said RF tag;
    placing said data storage device into service based on said RF tag; and
    communicating a location and hardware and software configuration information of said data storage device to said manufacturer via the RF tag and a remote monitoring system utilizing an electronic data interchange (EDI), the remote monitoring system being outfitted with an RF reader;
    wherein said RF tag contains the hardware and software configuration information about said data storage device, and said data storage device is a drive tray or a controller.

* * * * *